UNITED STATES PATENT OFFICE.

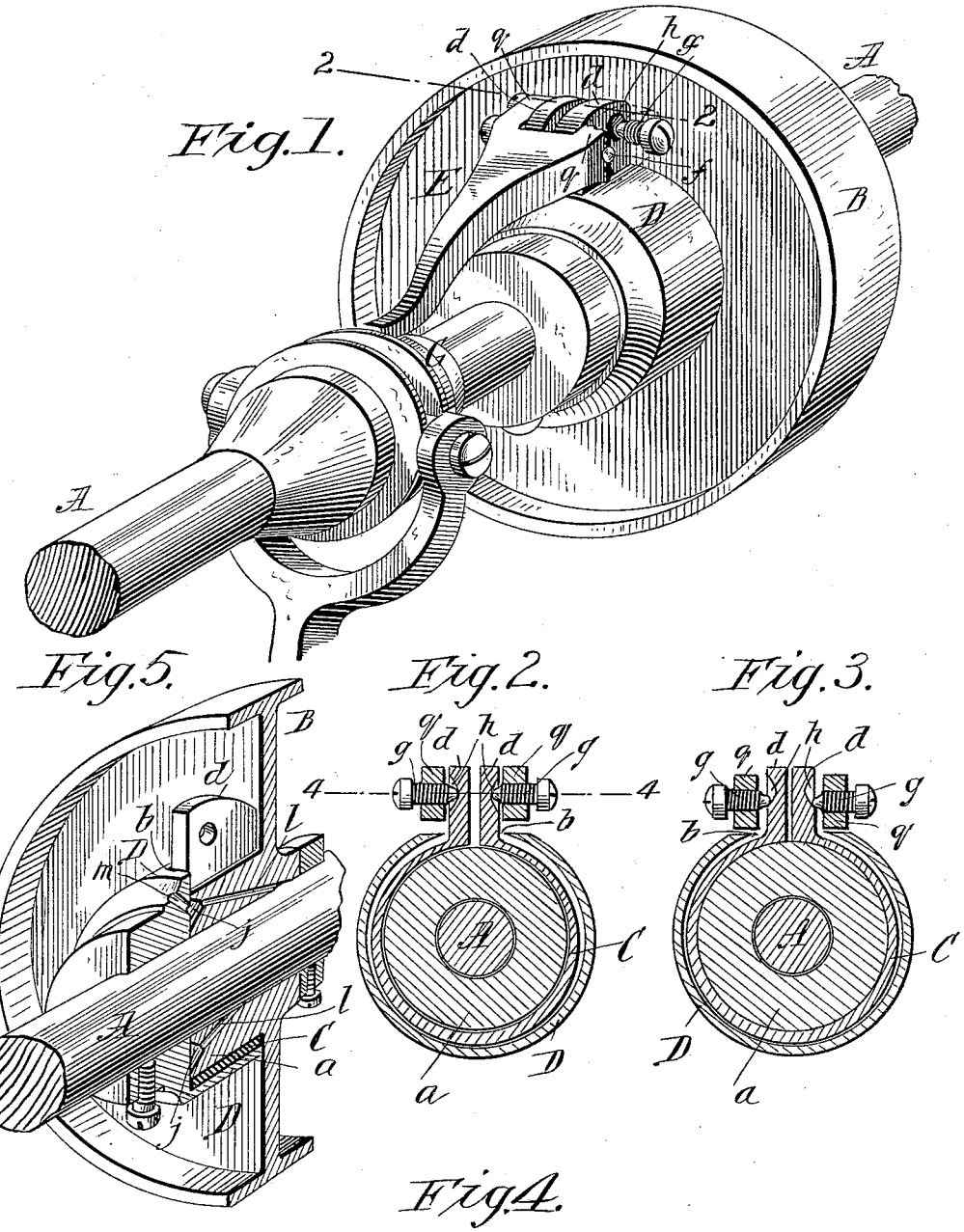

CHARLES E. BURWELL, OF SPRINGFIELD, MASSACHUSETTS.

FRICTION-CLUTCH.

SPECIFICATION forming part of Letters Patent No. 451,752, dated May 5, 1891.

Application filed March 4, 1891. Serial No. 383,697. (No model.)

*To all whom it may concern:*

Be it known that I, CHARLES E BURWELL, a citizen of the United States, residing at Springfield, in the county of Hampden and State of Massachusetts, have invented new and useful Improvements in Friction-Clutches, of which the following is a specification.

This invention relates to improvements in friction-clutches of the class in which a friction-strap is employed, which is mounted on the shaft to turn as one therewith, but which is normally loose relative to the hub of the loose pulley which said strap encircles, and which strap is adapted, through the movements of certain devices, to assume a bind on the said hub, whereby from the rotation of the pulley the shaft will also be rotated.

The object of the invention is to provide a friction-clutch of the character indicated, which is of unusual efficiency and which is most simple, cheap, and durable; and to these ends the invention consists in the construction and combination of parts, all substantially as will hereinafter more fully appear, and be set forth in the claims.

Referring to the accompanying drawings, in which the present improved friction-clutch is illustrated and in which similar letters of reference indicate corresponding parts in all the views, Figure 1 is a perspective view of the clutch. Fig. 2 is a cross-section of parts of the clutch, taken on the line 2 2, Fig. 1. Fig. 3 is a sectional view similar to Fig. 2, but showing the strap as contracted upon the hub instead of loose, as in said former figure. Fig. 4 is a section and partial plan view taken on the line 4 4, Fig. 2. Fig. 5 is a sectional and perspective view to illustrate features of construction to be hereinafter referred to.

In the drawings, A represents the shaft, and B the pulley loose thereon and provided at one side with the extended hub $a$, which is entered within the hollow hub D, that is fixed by screw, key, or otherwise to the shaft. The said hollow hub at its one side is apertured, as at $b$, and between the inner wall of said hollow hub and the periphery of the pulley-hub the friction-strap C is disposed, the same being formed with the radially-extended ear-pieces $d\ d$, which project through the said aperture beyond the outside of the hub D.

E represents a lever, which at its end next to the pulley is bifurcated, the opposing members $q\ q$ lying at both sides of and embracing the strap ear-pieces, being pivotally supported on said ear-pieces by the pin or screw $f$. (See Figs. 1 and 4.) The said members $q\ q$ of the lever carry at one side of the pivotal line corresponding with the axis of the screw-pin $f$ the studs or screws $g$, having their ends rounded, as shown, and said studs $g$ by their said rounded inner ends rest within shallow conical depressions $h\ h$, which are formed in the outer sides of the strap ear-pieces $d\ d$. Of course it will be clear that when the points of the studs $g$ are at or upon the centers or lowest sections of the said depressions and the strap from its inherent spring reacts to expand the strap will be loose on the hub of the pulley and the pulley free to rotate independently of the shaft; but if the lever E is so swung that the points of the studs impinge upon the inclined sides of said depressions, as indicated in Fig. 3, the ear-pieces will be forced together, contracting and drawing the strap to a firm bind upon the pulley-hub $a$. The strap C, having its ear-pieces in engagement with the sides of the aperture in the wall of the hollow hub which is fixed on the shaft, is caused to turn as the shaft is turned, and of course when the strap binds upon the pulley-hub the pulley will rotate with the shaft. The lever, which is pivotally supported on the ear-pieces of the strap, as described and shown, by its end which is the farther from the pulley, is of suitable form to receive the impingement thereon of the slide-cone G, which is mounted on the shaft, and which receives its sliding motion through means of a shipper-lever or otherwise, as desirable and common in clutches. The screw-studs $g$, which engage by their ends in the depressions $h\ h$ of the strap ear-pieces, are due to their screw-thread engagement with said ear-pieces, adjustable toward and from the bottoms of said depressions, so that wear may be compensated for and a more or less close contraction of the strap be secured on a given swing of the lever. The pulley-hub is provided in its end which lies within the hollow hub of the shaft and next to the inner end wall thereof with an annular groove $j$, from which at different intervals about the circular course of same ducts $l$ obliquely and inwardly extend to communicate with the central opening through which the shaft passes, some of these ducts terminating at said opening at different points along the length of the shaft. There is a perforation $m$ through the hollow hub, which is opposite the said annular groove, and thus said perforation, the groove, and the oblique radial ducts render the clutch susceptible of being readily lubricated.

What I claim as my invention is—

1. In a friction-clutch, in combination, a shaft and a pulley normally loose thereon and having a hub, a strap engaged with the said shaft to rotate therewith and encircling said pulley-hub and provided with ear-pieces, one or both of which have an inclined bearing-surface thereon, a lever pivotally supported on said ear-pieces and provided with a stud or studs which are out of coincidence with said pivotal point and which have a bearing on said inclined surfaces, and a device for swinging the said lever, for the purpose set forth.

2. In a friction-clutch, in combination, a shaft and a pulley normally loose thereon and having a hub, a strap engaged with the said shaft to rotate therewith and encircling said pulley-hub and provided with ear-pieces $d\ d$, each having on its opposite outer sides the depressions having the inclined bearing-surfaces $h\ h$, and the lever pivoted and supported at an intermediate part on the said ear-pieces, which pivotal line is out of coincidence with said depressions and provided on its one arm with the laterally-disposed screw-studs which bear within said depressions, and a sleeve movable on the shaft, having an inclined surface to engage the other arm of said lever to swing the same, substantially as and for the purposes set forth.

3. In a friction-clutch, in combination, a shaft and a pulley normally loose thereon having a hub, a strap encircling said hub and having outwardly-extended ear-pieces $d\ d$, with the depressions $h\ h$ therein, the walls of which form bearing-inclines, the hollow hub D, fixed on the shaft, having the aperture $b$, with the edges of which the said strap ear-pieces engage to secure on the rotation of the shaft also the rotation of the strap, the lever pivotally mounted intermediately of its length and out of coincidence with said depressions on the said ear-pieces and having the studs to bear on the walls of said depressions, and the cone-sleeve mounted to slide on the shaft to swing the said lever, substantially as described.

4. In a clutch, in combination, a shaft and a pulley normally loose thereon, provided with a hub which in its end has the annular groove $j$ and the ducts which lead obliquely from the said groove to the axial opening through the hub as shown, the strap encircling the said hub and provided with the ear-pieces having bearing-inclines thereon, the hollow hub fixed on the shaft, inclosing the said strap and pulley-hub and having a perforation leading to said annular groove and provided with the recess through which the said strap ear-pieces pass, the pivoted lever, having an engagement with said strap-lugs, for the purpose set forth, and a device for swinging said lever, substantially as described.

CHARLES E. BURWELL.

Witnesses:
 WM. S. BELLOWS,
 G. H. CHAMBERLAIN.